United States Patent [19]

Hansen

[11] Patent Number: 5,412,576

[45] Date of Patent: May 2, 1995

[54] SELECTIVE ASSEMBLY OF COMPONENT KITS

[75] Inventor: Gary L. Hansen, Savage, Minn.

[73] Assignee: Honeywell Inc., Minneapolis, Minn.

[21] Appl. No.: 991,970

[22] Filed: Dec. 17, 1992

[51] Int. Cl.$^6$ .......................................... G06F 15/46
[52] U.S. Cl. .................................. 364/468; 364/401; 395/11; 395/904; 395/919
[58] Field of Search ............ 364/468, 478, 401, 402, 364/403, 474.24; 395/11, 21, 50, 54, 52, 77, 903, 904, 906, 919

[56] References Cited

U.S. PATENT DOCUMENTS

| | | | |
|---|---|---|---|
| 4,821,197 | 4/1989 | Kenik et al. | 364/468 |
| 4,870,591 | 9/1989 | Cicciarelli et al. | 364/468 |
| 5,109,337 | 4/1992 | Ferriter et al. | 364/401 |
| 5,119,307 | 6/1992 | Blaha et al. | 364/468 |
| 5,121,467 | 6/1992 | Skeirik | 395/23 X |
| 5,260,866 | 11/1993 | Lisinski et al. | 364/468 X |

OTHER PUBLICATIONS

Alguindigue, Isreal E. and Uhrig, Dr. Robert E., "Neural Networks: Compression of Spectral Signatures Using Recirculation Neural Networks," Scientific Computing & Automation, May 1991, pp. 43–50.

Baer, Tony, "AI is Becoming Embedded in Manufacturing Software," Managing Automation, Mar. 1991, p. 17.

Beale, Mark and Demuth, Howard, "Neural Networks: Building a Neural Network Application," Scientific Computing & Automation, May 1992, pp. 19–21.

Benassi, Frank, "Honeywell Integrates Building and Process Controls in Factories," Managing Automation, Mar. 1991, pp. 38–40.

Bennett, Bonnie, University of St. Thomas, private communication to inventor, Sep. 1988.

Berardinis, Lawrence A., "Untangling the Mystery of Neural Networks," Machine Design, Jun. 25, 1992, pp. 55–59.

Berardinis, Larry, "Strong Bonds Link Neural and Fuzzy Computing," Machine Design, Jul. 23, 1992, p. 18.

Chester, Dr. Daniel, "Neural Networks: New Trends in Neural Networks," Scientific Computing & Automation, May 1992, pp. 43–48.

Harper, Paul and Samad, Tariq, "Neural Networks: A Computing System Organized Like a Network of Nerve Cells can Readily Carry Out Certain Tasks that are Difficult for Ordinary Computers, Such as Classifying Patterns and Generalizing from Examples," Scientific Honeyweller, Summer 1988, pp. 109–121.

Jain, Ph.D., Sanjay, and Osterfeld, David H., "Applying Expert Systems in Automated and Traditional Environments," Manufacturing Systems, Aug. 1991, pp. 24–31.

Machine Design pulication, "New Motor provides Dual Motion," Jul. 23, 1992.

Porter, Michael L., "Neural Nets Offer Real Solutions—Not Smoke and Mirrors," Personal Engineering & Instrumentation News, Nov. 1991, pp. 29–38.

Ross, Dr. Muriel D., "Biological Neural Networks: Models for Future 'Thinking' Machines," NASA Tech Briefs, Jun. 1991, pp. 10–11, 131.

Schmitt, Larry, "Neural Networks Solve Complex Vision Problems," Automation, Aug. 1991, pp. 38–40.

Shelton, Robert O., "Method Accelerates Training of Some Neural Networks," NASA Tech Briefs, Apr. 1992, p. 96.

Studt, Tim, "Neural Networks: Computer Toolbox of the '90s," R&D Magazine, Sep. 1991, pp. 36–42.

Zygmont, Jeffrey, "Artificial Intelligence It's Only Software After All," Managing Automation, Mar. 1991, pp. 30, 32.

*Primary Examiner*—Joseph Ruggiero
*Attorney, Agent, or Firm*—Robert B. Leonard

[57] ABSTRACT

A computerized method for the automatic selection of component kits from an inventory of component parts. A first list of component parts is created by a rule-based expert system and a second list of component parts is created by a previously trained node-based neural network. The first and second lists are then reconciled into a final list.

22 Claims, 8 Drawing Sheets

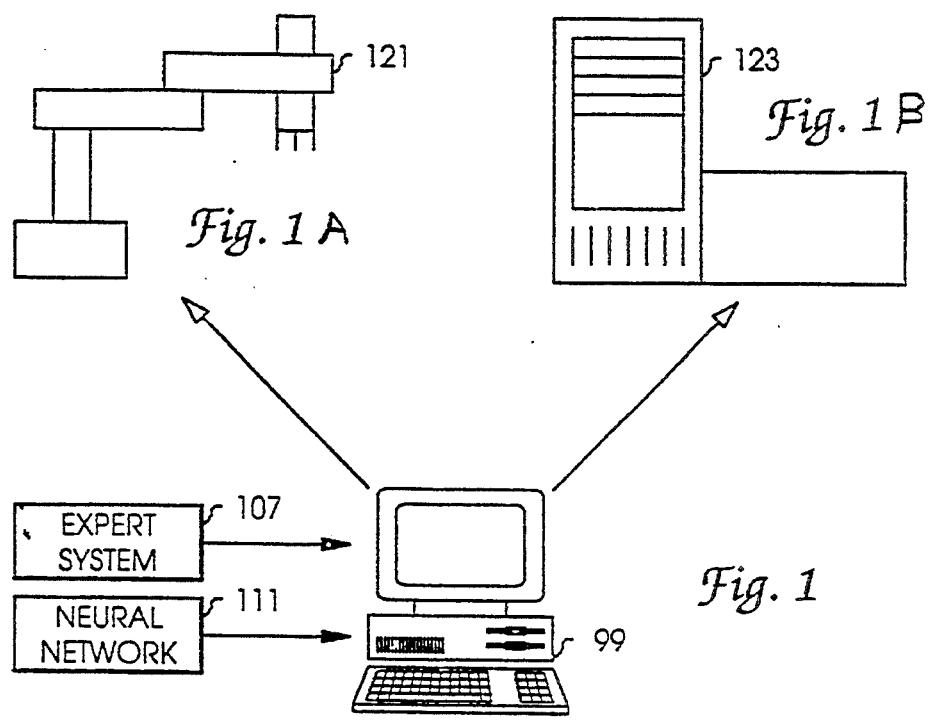
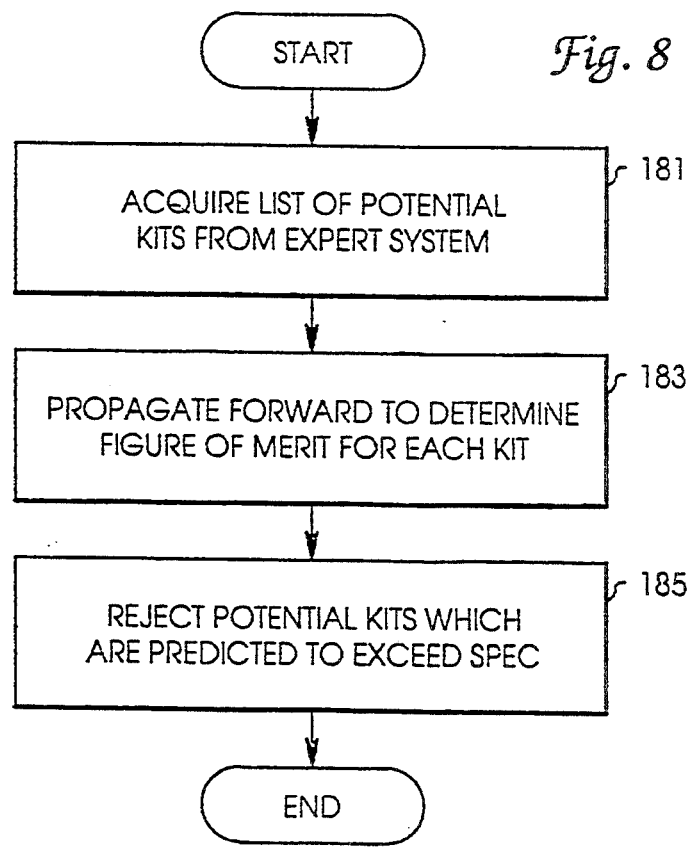

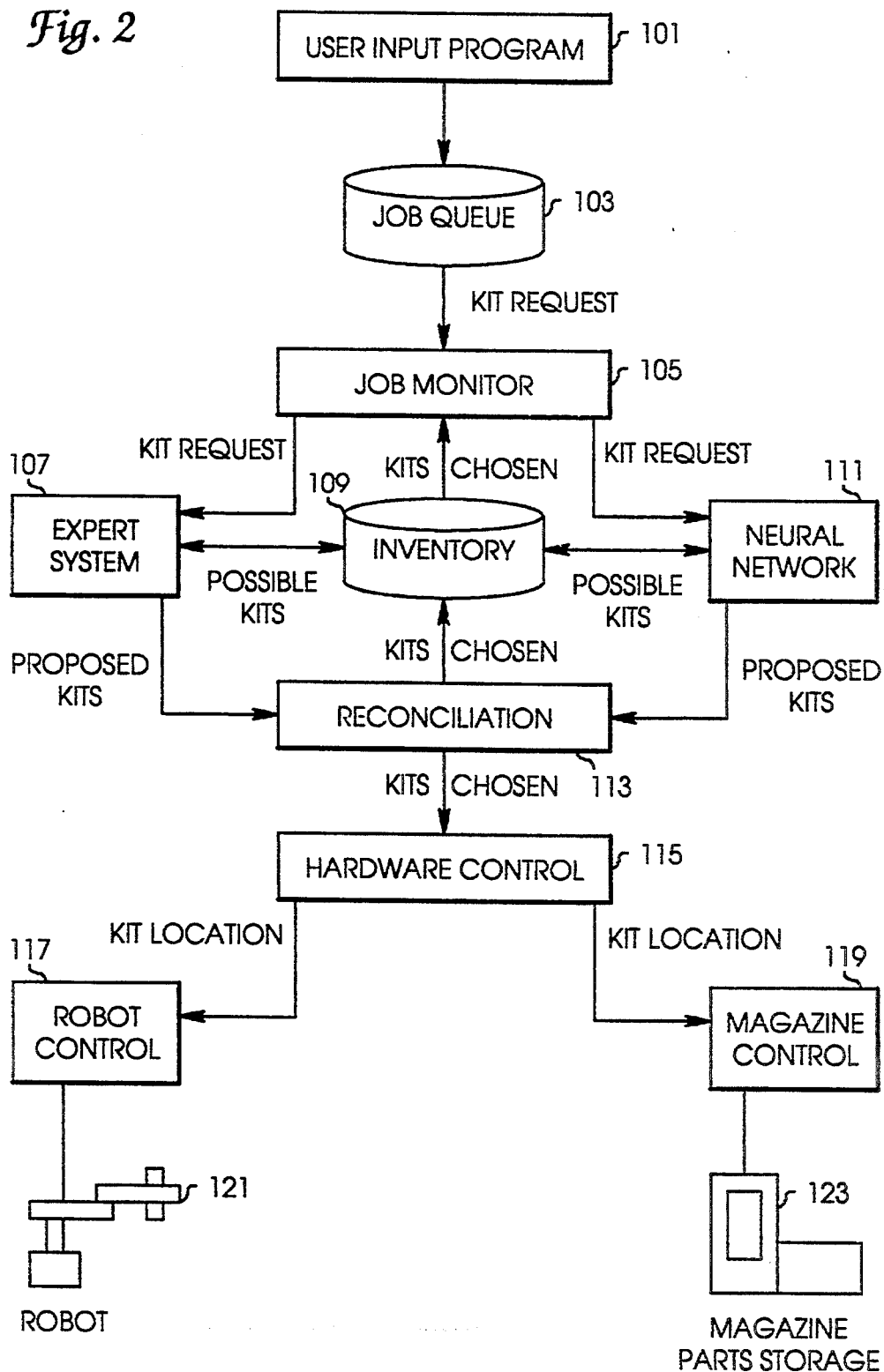

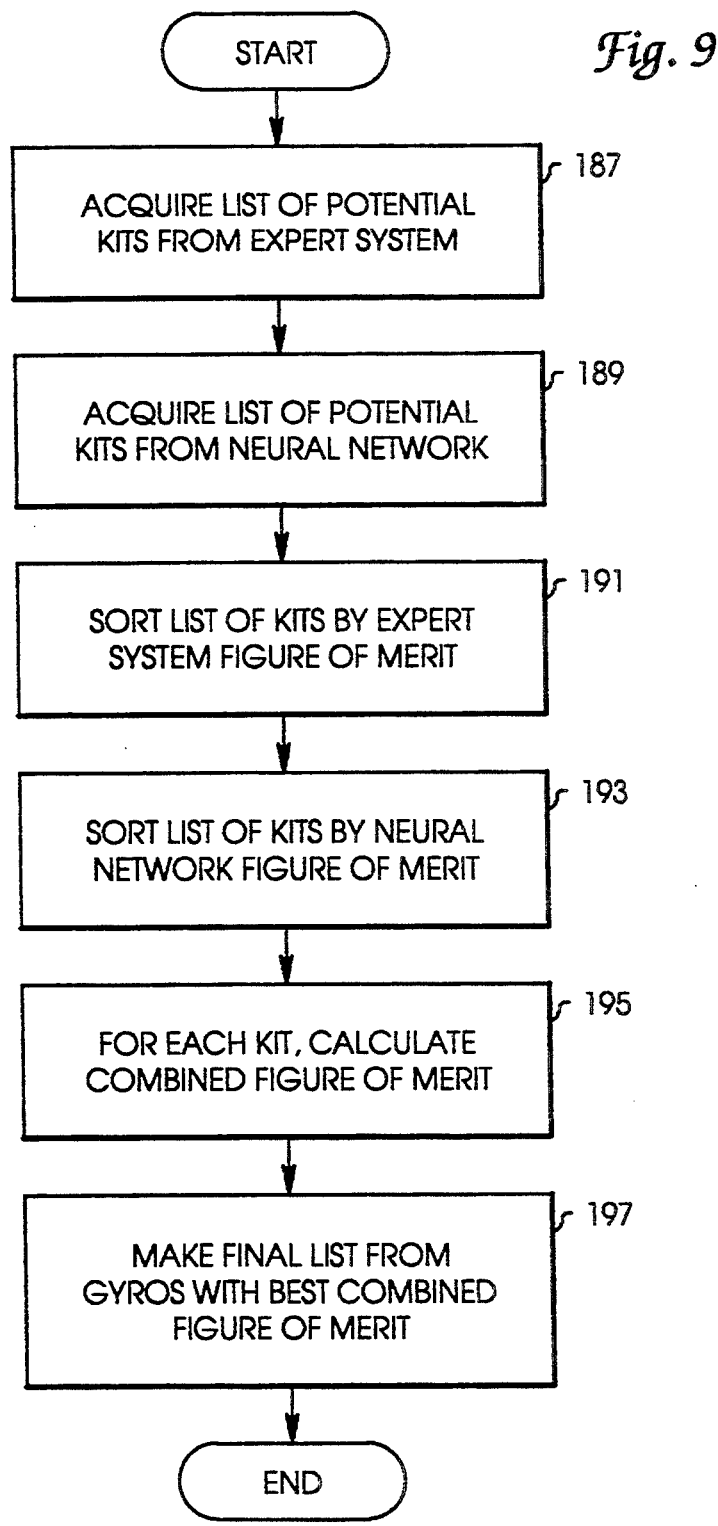

SELECTIVE ASSEMBLY OF COMPONENT KITS

FIELD OF THE INVENTION

The present invention pertains generally to a system for automatically handling component parts, and more particularly to a system for automatically selecting component kits from an inventory of component parts.

BACKGROUND OF THE INVENTION

Some manufacturing processes involve the selective choice of components for the assembly of a finished product. This selection may be directed at enhancing the cost, quality, or performance of such products, or if the components are expensive, at enhancing the process yield. The components are tested, either individually or as a lot, with the test data used for component selection or "kitting".

Because the kitting criteria may be very complex, a variety of modern techniques have evolved for aiding in the selection process. One technique is the expert system, which makes recommendations based on a collection of explicit rules gleaned from human "experts". Another technique is the neural network or net, which is progressively trained to recognize patterns in the selection process based on the actual outcome of the process.

While expert systems are well-known in the art and have established a place in industrial applications, neural nets are still new enough to deserve some explanation and justification.

The simulation of human neural patterns on a computer has been discussed for more than 30 years but practical applications remained limited until the recent development of better learning algorithms. These have made neural nets a powerful new tool for any application that involves pattern recognition.

The most common neural net configuration is the multi-layer feed forward, back propagation network. In such a network, each node in the network represents a "neuron", such as those found in the human brain. Each neuron contains a small amount of processing power. Used in parallel, they constitute the network. Like their physical counterparts, each neuron has an "activation" level, which depends on the amount of stimulation it receives from the neurons around it. Based on an "activation function", the neuron sends its resulting output to others around it.

In a feed forward network, each neuron is connected to all of the neurons in the layer before it, and also to the neurons in the next layer. However, connections move only in the forward direction. By changing the importance of each connection, it is possible to train the network to associate inputs with outputs. A recent algorithm, back propagation, is used to gradually shift the weights of the connections until the network is "trained".

A properly trained network has interesting properties. First, it is possible to store a large amount of information in relatively small number of neurons. This is because the neural net is actually a device for generalizing constraints. Irrelevant factors are quickly randomized as the network learns, leaving only those features which are truly important for making distinctions. If data items are contradictory, or partially dependent on each other, the neural net will have difficulty because no unique set of constraints exists which will optimize the weights.

Second, since the information is stored as part of the network structure, it is necessarily cryptic. The patterns are stored implicitly within the network as a whole, not locally as in a conventional data file. This puts them beyond the means of direct inspection; one may not ask the network why it came to a particular conclusion. The output of the network is the combined result of the training data, the network architecture, the activation function, and the learning algorithm. Therefore, information can not be addressed directly.

Third, while nonlocality of data may be perceived as a drawback, it is also a virtue because it is the key to enable a neural net to generalize. In most rule based systems, small differences in the input data can result in an incorrect answer. Neural nets, however, degrade gracefully. Inaccuracies in the input can still allow a neural net to come to the correct conclusion. Thus, recognition of items that are similar but slightly different is a strong point for this technique.

Neural nets have already found their way into a number of industrial applications. Many involve some form of image recognition, such as handwriting recognition. Neural nets are also used to help decrease impurity levels in chemical processing facilities. A neural net vision system is now used to recognize cancerous cells in PAP smears, and another is used to detect the nuclear signatures of explosive material in a bomb detection system. Other uses include process control and noise suppression in television receivers. These and many other industrial tasks depend, in one way or another, on pattern recognition. This requirement is a strong point of neural nets.

Even with many advantages, neural nets are not appropriate for all applications. Expert systems are typically the best choice for tasks with a well defined process or a written set of requirements. Multivariant statistical analysis is yet another tool which can be used for problems which lack well defined rules, but have a wealth of data.

Expert systems and neural nets when used alone are each inadequate for reliable kitting. Expert systems provide direct and comprehensible control over the contents of the system, but they are difficult to develop and depend on the reliability of the original expert. They are, however, easy to understand and maintain once constructed. Neural nets are easy to train, but it is difficult to understand the internal representation of their knowledge. Also, neural nets are only as good as their training data, which may be incomplete or contradictory.

Therefore, there is a need to improve the reliability of kitting procedures that may be met by combining an expert system with a neural net in one kitting system.

SUMMARY OF THE INVENTION

The present invention provides a computerized method for the automatic selection of component kits from an inventory of component parts. A first list of component parts is created by a rule-based expert system and a second list of component parts is created by a previously trained node-based neural network. The first and second lists are then reconciled into a final list.

BRIEF DESCRIPTION OF THE DRAWINGS

FIG. 1, 1a, and 1b is a diagram showing the system architecture of a kitting system which is compatible with the present invention.

FIG. 2 is a block diagram showing the data flow of a kitting system which is compatible with the present invention.

FIG. 8 is a flowchart showing a method of kit selection with a neural network which is compatible with the present invention.

FIG. 9 is a flowchart showing a method of reconciling kit selections from an expert system and a neural network which is compatible with the present invention.

DETAILED DESCRIPTION OF THE PREFERRRED EMBODIMENTS

Figure 3:
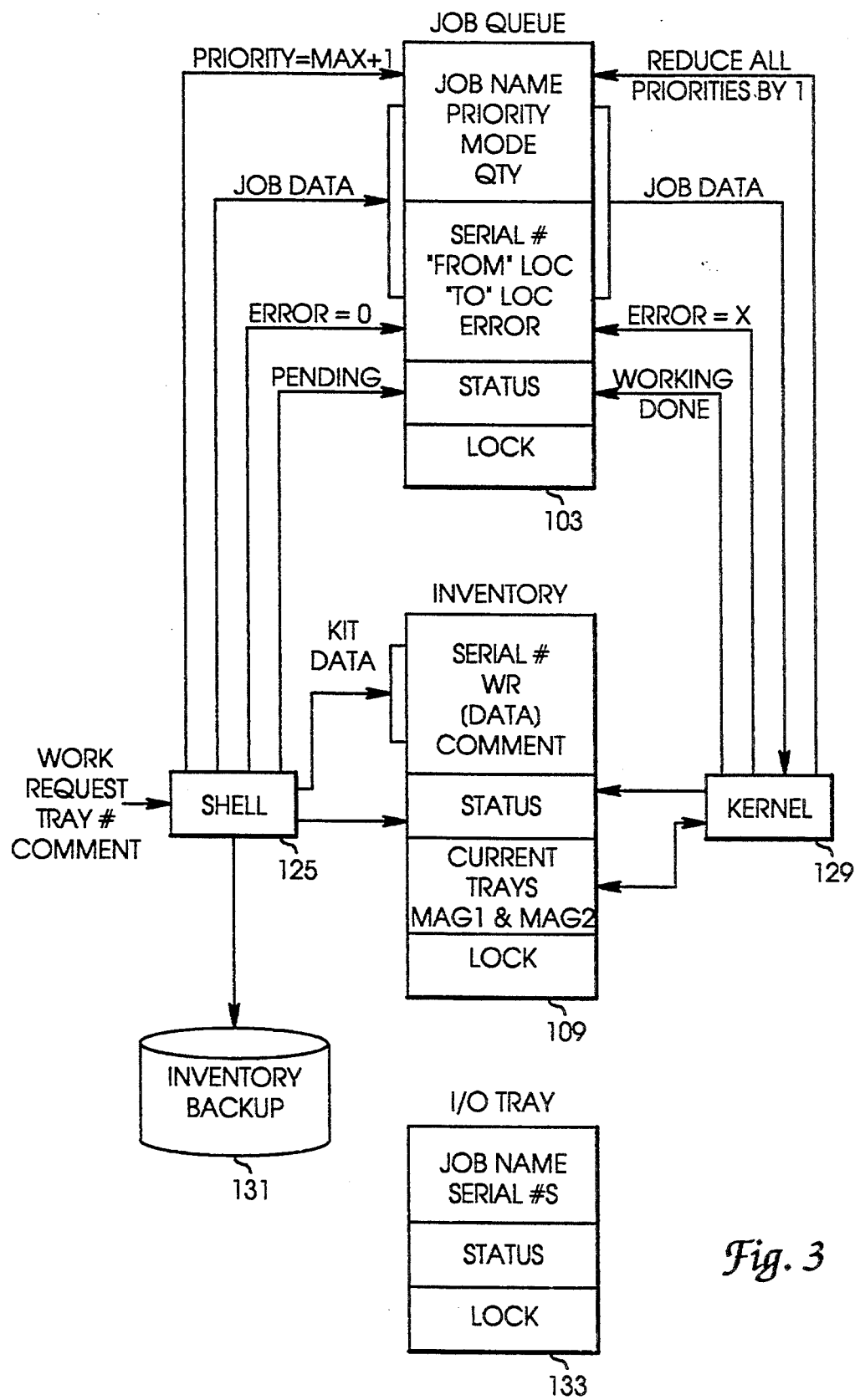
FIG. 3 is a block diagram showing the entry of new parts into a kitting system which is compatible with the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

In a particular instance of interest to the assignee of the present invention, Honeywell Inc., the present invention is used to select mirrors for building laser gyroscopes. Three high-performance mirrors are used in each gyroscope kit, and the mirrors must be carefully matched to insure that the overall performance of the gyroscope falls within a specified range.

FIG. 1, 1a, and 1b shows a preferred system architecture used to automatically select component kits from an inventory of component parts. A programmed computer 99 preferably uses rule-based expert system software 107 and node-based neural network software 111 to instruct an industrial robot 121 to automatically select individual components from an inventory of parts in a component magazine 123.

FIG. 2 reveals the components of a preferred kitting system. A user input program 101 sends kit information to a job queue 103, where a job monitor 105 notes the kit request and reads a stored list of component parts from an inventory 109 and sends the list of parts to the expert system 107 and neural network 111. The expert system 107 and neural network 111 each propose a list of kits which are reconciled into a final list at 113, then sent to a hardware control 115 for building. Hardware control 115 in turn sends commands to a robot control 117, which instructs the industrial robot 121, and a magazine control 119, which instructs the component magazine 123.

FIG. 3 describes the components used to perform the entry of new parts into a preferred kitting system. A shell program 125 acts as the user interface to the system. Using the shell program 125, a user can add parts to the inventory, request kits, and perform other maintenance tasks. A kernel program 129 is used to control the kitting hardware. An inventory backup 131 includes a file stored on fixed storage medium such as a tape or hard disk which duplicates the contents of the inventory 109 and I/O tray memories. The inventory backup 131 provides a way to recover data in case of a computer failure.

A job queue 103 is an area in computer memory shared by the shell 125 and kernel 129. The preferred job queue 103 has the following data items:
a) Job name—a text description of a job.
b) Priority—a number from 1 to 20 designating the order in which a job is performed. Priority=1 means next on the list, priority=0 means a current or complete job.
c) Mode—a flag designating the operational mode of the job. Mode=1 means normal part transfer from location to location. Mode=2 means checking part locations for missing parts.
d) Quantity—the number of parts in the job.
e) Serial numbers of the parts in the job.
f) The "From" location of each part—an index of where in the magazine 123 the part is from.
g) The "To" location of each part—an index of where the part is to moved.
h) Error code—0=no error, 1=error handling this part.
i) Status—status of the job. A text description, "Pending", "Current", or "Complete".
j) Lock—a flag that prevents changes during the inventory in maintenance.

An inventory 109 is typically the shared working memory of the system, and reflects the physical contents of the inventory. The preferred inventory 109 has the following data items:
a) Serial number—the serial number of each part.
b) Work request (lot number) of each part. (With the Serial number, forms a key to reference test data).
c) Part test data used for kitting.
d) Status of a location:
  1=Location now empty—available for use.
  2=Location now empty—reserved for a future part.
  3=Location now filled—part is available for kits.
  4=Location now filled—part is reserved for a kit.
e) Current trays now extracted by magazines 1 and 2.
f) Lock—a flag that prevents changes during the inventory during maintenance.

An input/output (I/O) tray 133 is typically a memory structure that records the completed kits, and reflects the current status of the physical I/O trays. The preferred I/O tray 133 has the following data items:
a) Job name—copied from the job queue.
b) Part serial number—serial number of each part moved.
c) Status—status of each location. (Same as the inventory memory.)
d) Lock—a flag that prevents changes in the inventory during maintenance.

An example work request for adding parts to the system is also shown in FIG. 3. The shell program 125 first typically performs the following steps:

1. Get the work request number from the user and the magazine slot that the tray of parts will occupy.
2. Set the job queue information:
   a) Select the priority of the job equal to the current maximum+1.
   b) Set the mode to 2: test part locations. This scans the tray for missing parts.
   c) Set the quantity equal to the number of parts in the tray.
   d) Set the serial numbers of the kitted parts.
   e) Set the "from" and "to" locations for each part.
   f) Set the error code for this part to 0.
   g) Set the status for the job to "Pending".
3. Set the inventory information.
   a) Assign the serial number and work request to each inventory location.
   b) Assign the part data and comment to each inventory location.
   c) Set the status of each location to 3 (filled—reserved).

Once a job has been started by the shell 125, the kernel 129 typically performs the following steps:
1. Reduce all priorities by 1. Set job queue status to "current".
2. Read the mode and the "from" and "to" locations from the job queue.
3. Check the tray for the part specified. Set current tray for the appropriate magazine to the tray index.
4. If there is an error checking the part, set job queue error to 1.
5. If the part is found, set inventory status to 2 (filled—available).
6. When the job is complete, set job queue status to "done".

Figure 4:
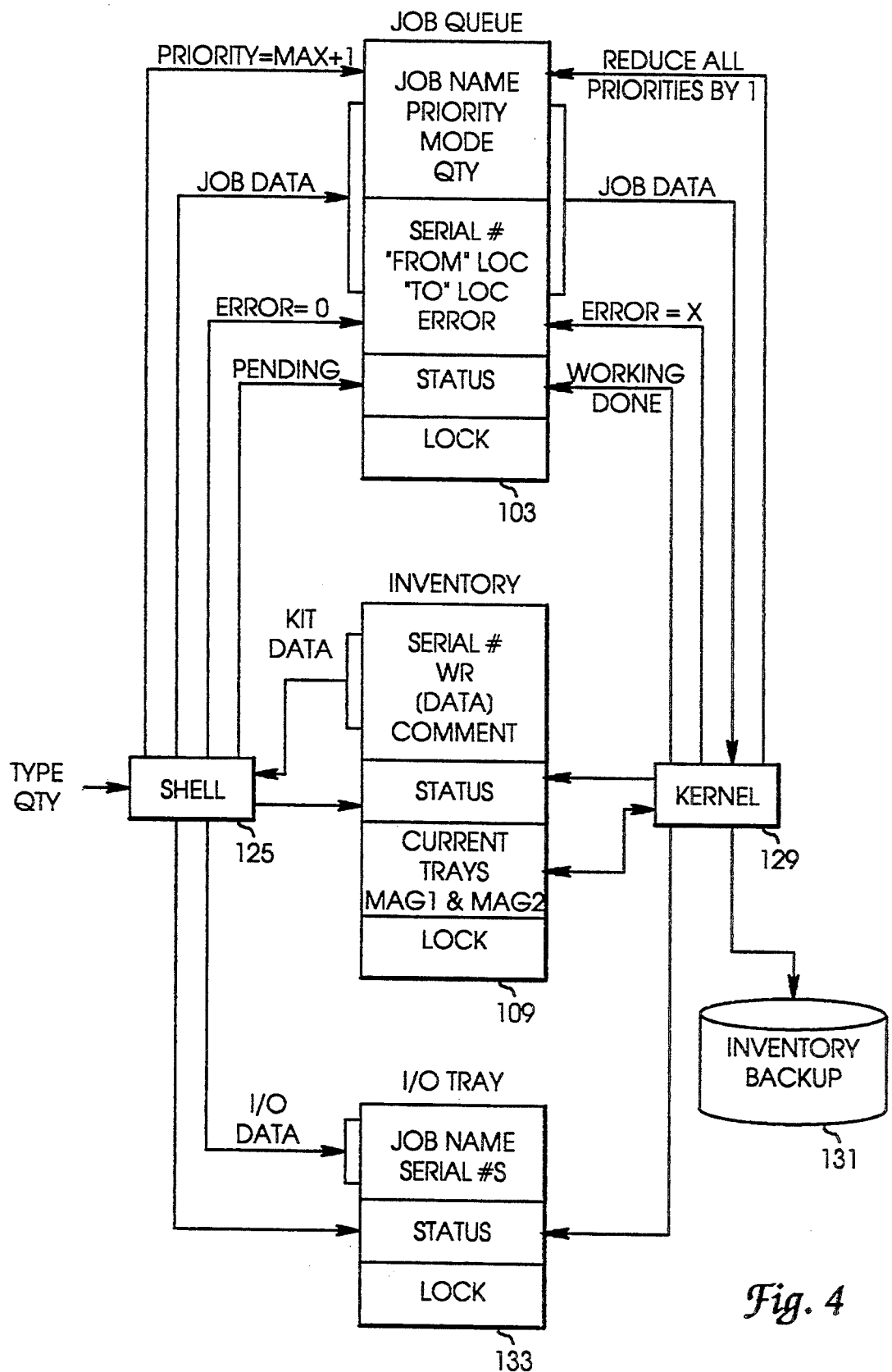
FIG. 4 is a block diagram showing the assembly of kits by a kitting system which is compatible with the present invention.

FIG. 4 illustrates an example of a method for assembling kits. The shell program 125 first typically performs the following steps:
1. Get the number and type of kits from the user.
2. Read the kits data from the inventory. Run the kitting algorithm in order to determine the kits and the location of the necessary parts.
3. Set the job queue information.
   a) Select the priority of this job equal to the current maximum+1.
   b) Set the mode to 1: move parts.
   c) Set the "quantity field" equal to the number of parts in the kits.
   d) Set the serial numbers of the kitted parts.
   e) Set the "from" and "to" locations for each part.
   f) Set the error code for this part to 0.
   g) Set the status for this job="pending".
4. Set the inventory information.
   a) Set the status for each location to 3 (filled—reserved). This prevents this part from being used for other kits.
5. Set the I/O tray information.
   a) Copy the job name to each relevant I/O tray location.
   b) Copy the part serial number to each relevant I/O tray location.
   c) Set the status of each relevant location in the I/O tray to 1 (empty—reserved).

Once a job has been started by the shell 125, the kernel 129 typically performs the following steps:
1. Reduce all priorities by 1. Set job queue status to "current".
2. Read the mode and the "from" and "to" locations from the job queue.
3. Move the specified part from inventory to the I/O tray. Set current tray for the appropriate magazine to the tray index.
4. If there is an error moving the part, set job queue error to 1.
5. If the part is successfully moved, set inventory status to 0 (empty—available).
6. If the part is successfully moved, set I/O status to 3 (filled—available).
7. When the job is complete, set job queue status to "done".

Figure 5:
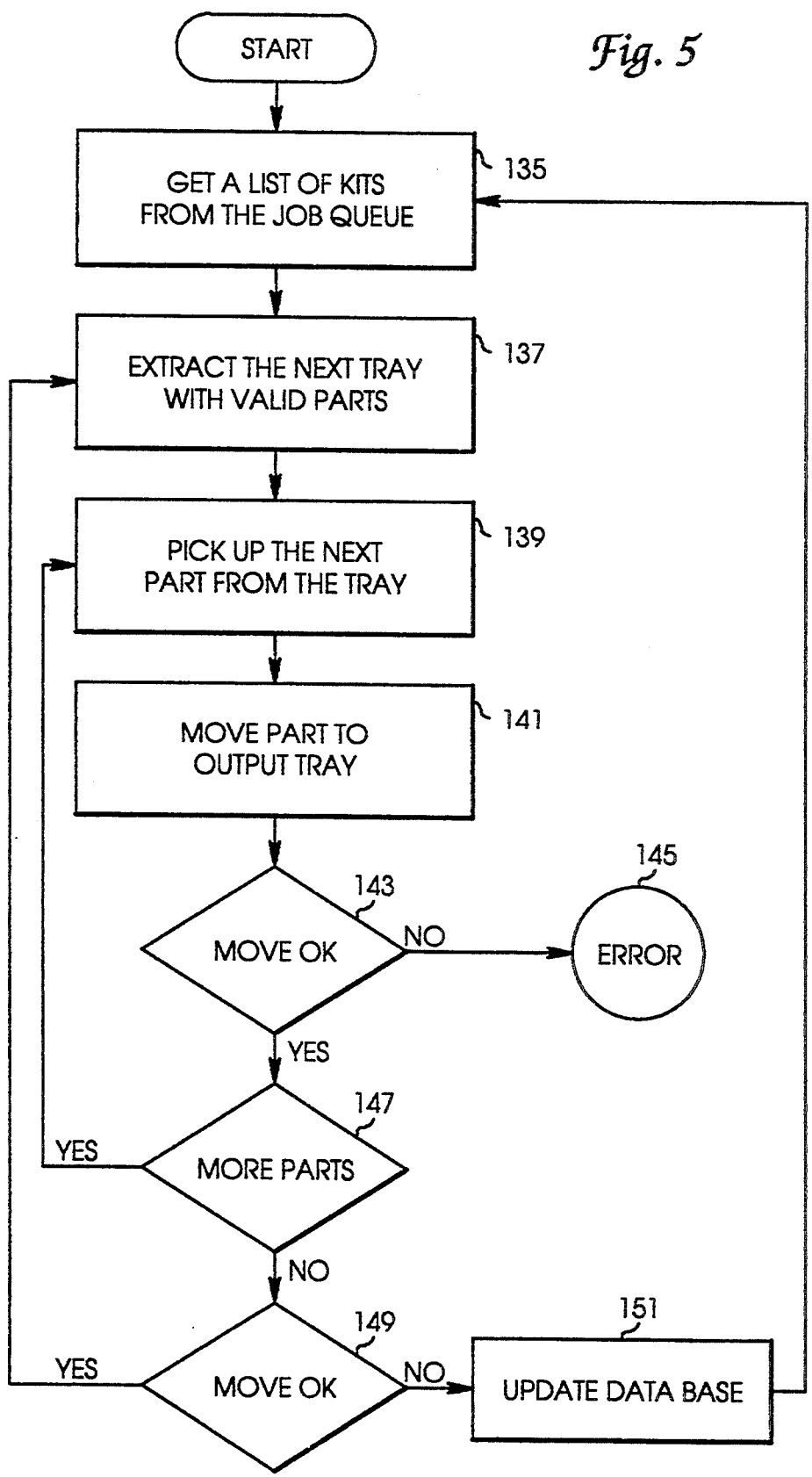
FIG. 5 is a flowchart showing a method of kitting system hardware control which is compatible with the present invention.

FIG. 5 shows a preferred method of hardware control with the present invention. At 135 a list of kits to build is obtained from the job queue 103. The next tray with component parts is extracted at 137 from the magazine storage 123, and the next part is picked up from the tray at 139 and moved to an output tray at 141. The move is checked at 143 to see if there were problems. If so, the method enters an error state 145 and terminates. If not, the method checks at 147 for more parts, and if so, returns control to 139. At 149, if there were problems with the move, the inventory database is updated at 151 and control is returned to 135. Otherwise, control returns to 137.

Figure 6:
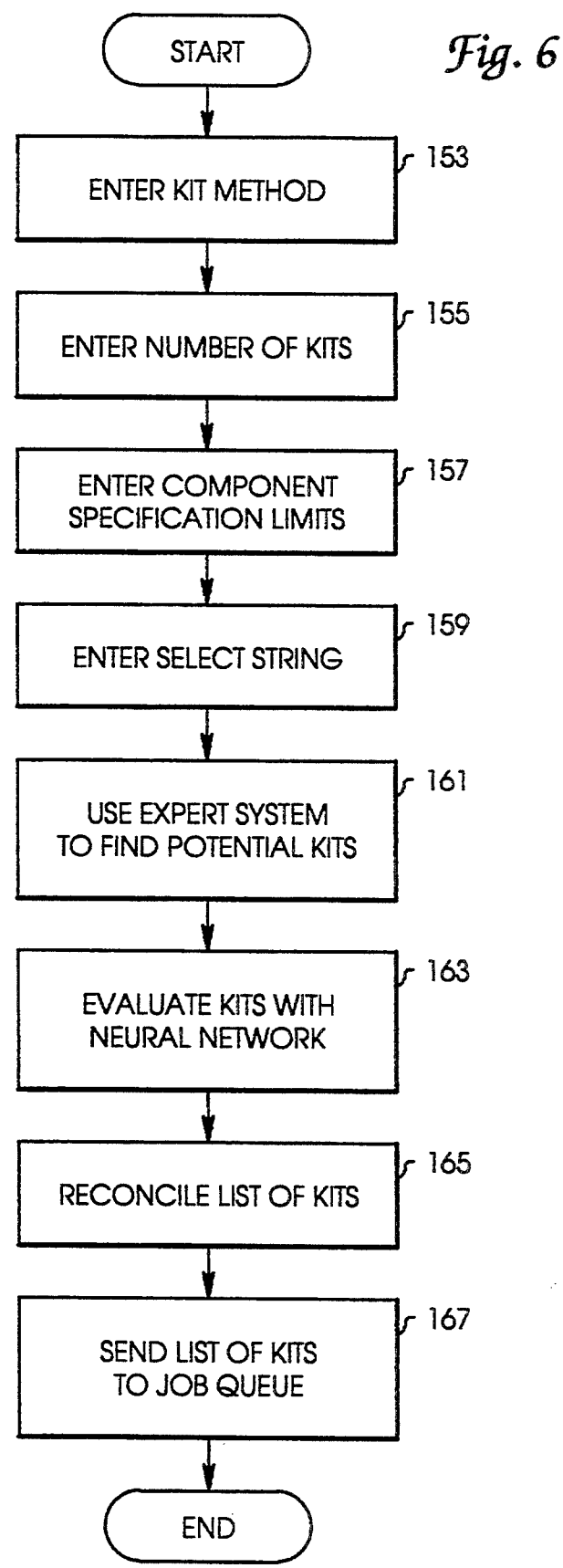
FIG. 6 is a flowchart showing a method of kit selection which is compatible with the present invention.

FIG. 6 reveals a preferred method of kit selection with the present invention. A user enters a kit method at 153, the number of kits to build at 155, component specification limits at 157, and a select string at 159. A global list of component parts is then created from the list of parts stored in inventory. At 161 the information is sent to the expert system 107 which generates a first list of potential kits, and at 163 sent to the neural network 111 which generates a second list of potential kits. The first and second lists are then reconciled into a final list at 165, and the final list is sent at 167 to the job queue 103.

Figure 7:
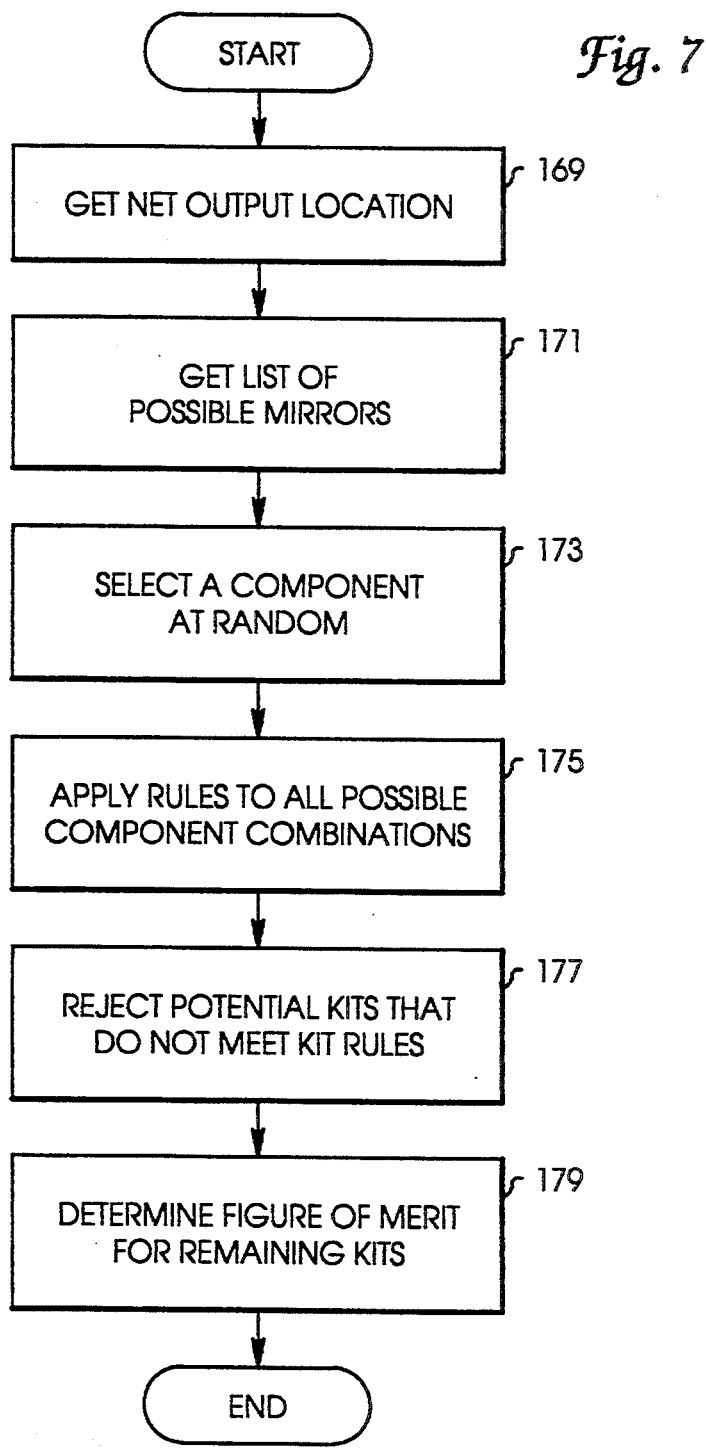
FIG. 7 is a flowchart showing a method of kit selection with an expert system which is compatible with the present invention.

FIG. 7 describes a preferred method of kit selection with an expert system which is part of FIG. 6, 161. An output location is obtained at 169, and a list of possible components is obtained at 171. Other components are then selected at random at 173, and a list of expert system rules is applied to all possible combinations at 175. At 177 potential kits are rejected that do not meet the rules, and a figure of merit is determined for the remaining kits at 179.

FIG. 8 illustrates a preferred method of kit selection with a neural network which is part of FIG. 6, 163. A list of potential kits is obtained from the expert system 107 at 181, and each kit in the list is propagated forward at 183 in order to determine a figure of merit for each kit. At 185 potential kits are rejected that are predicted to exceed specifications.

It will be recognized by one of ordinary skill in the art that the order in which the expert system 107 and neural network 111 evaluate potential kits may be reversed without loss of generality. That is to say, the neural network 111 may instead send a first list of kits to the expert system 107 which creates a second list of kits to be reconciled with the first list. Alternatively, both the expert system 107 and neural network 111 may create a list of potential kits from the global list of component parts.

FIG. 9 illustrates a preferred method of reconciling kits. A list of potential kits is obtained from the expert system 107 at 187, and obtained from the neural network 111 at 189. At 191 the list of kits is sorted by the expert system figure of merit, and at 193 the list is sorted by the neural network figure of merit. A combined figure of merit for each kit is calculated at 195, and a final list of kits with a best combined figure of merit is generated at 197.

Descriptions of example user inputs, expert system rules, neural network node inputs, and reconciliation method are given below for the preferred embodiment of the present invention. The preferred embodiment is used to select mirrors for ring laser gyros, however, it will be understood that these methods are generic and potentially useful for a wide variety of other situations.

Inputs From User

| | |
|---|---|
| KITTING_METHOD = | Type of kitting algorithm. ("Performance", or "Inventory") |
| NUM_KITS_REQUESTED = | Number of kits requested. |
| MAX_NUM_TRIES = | Maximum number of tries to determine kit. |
| LOW_LOSS_LIMIT = | Lower loss limit for transducers. |
| SELECT_STRING = | Character string to use for selecting sub-groups of parts. |
| OUTPUT_SPOTS_LEFT = | Number of spots left in the output tray. |

Kitting Cell Rules
1. If NUMBER_KITS_REQUESTED < =0, then abort.
2. If NUMBER_KITS_REQUESTED > 50, then abort.
3. If OUTPUT_SPOTS_LEFT < =0, then abort.
4. If KITTING_METHOD = "Performance" then, select kits based on subsequent rules 4.1 through 4.13.
5. If KITTING_METHOD = "Inventory" then, select kits based on subsequent rules 5.1 through 5.11.
6. If not enough parts in inventory, then query the user:
 Take number of kits possible
 Abort
7. If not enough kits found, then query the user:
 Take number of kits possible
 Abort
8. Submit kits to the job queue.

Performance Optimization Algorithm Rules
4. If KITTING_METHOD = "Performance" then:
 4.1. If OUTPUT_SPOTS_LEFT < NUMBER_KITS_REQUESTED, then query user one of the following:
  QUIT
  CLEAR_OUTPUT_TRAY
  set NUMBER_KITS_REQUESTED = OUTPUT_SPOTS_LEFT
 4.2. Select candidate mirrors by the following rules:
  4.2.1. If candidate mirror has already been selected as part of another kit, then skip this part.
  4.2.2. If candidate part is not correct part type, then skip this part.
  4.2.3. If candidate part LOSS=null, then skip this part.
  4.2.4. If PART_TYPE = "output" and part TRANSMISSION = null, then skip this part.
  4.2.5. If candidate part STATUS = "not available", then skip this part
  4.2.6. If candidate part survives rules 4.2.1 through 4.2.5, then accept part as open for kitting.
  4.2.7. If SELECT_STRING < > null and candidate mirror is tagged with a label SELECT_STRING, then accept part as open for kitting.
 4.3. Select output mirror randomly.
 4.4. Set MAXIMUM_NUMBER_TRIES = number of available outputs.
 4.5. For chosen output mirror, calculate UPPER_LOSS_LIMIT, LOWER_LOSS_LIMIT.
 4.6. Calculate LOSS_CENTER = mid-range between UPPER_LOSS_LIMIT and LOWER_LOSS_LIMIT.
 4.7. Look through all available transducers:
  4.7.1. Select transducer A and B.
  4.7.2. If transducer A = transducer B, then skip this combination.
  4.7.3. Calculate KIT_LOSS_DELTA = difference between actual kit loss and LOSS_CENTER.
  4.7.4. Select transducer combination which results in the minimum KIT_LOSS_DELTA.
 4.8. If KIT_LOSS of selected kit > KIT_LOSS_MAXIMUM, then discontinue kitting.
 4.9. If KIT_LOSS of selected kit < KIT_LOSS_MINIMUM, then discontinue kitting.
 4.10. If potential kit passes rules 4.8 and 4.9, then accept kit.
 4.11. If NUMBER_OF_TRIES > MAXIMUM_NUMBER_TRIES, then discontinue kitting.
 4.12. If REMAINING_OUTPUTS = 0 and KITS_FOUND < KITS_REQUESTED, then query user:
  Submit NUMBER_KITS = KITS_REQUESTED
  Abort
 4.13. If REMAINING_TRANSDUCERS = 0 and KITS_FOUND < KITS_REQUESTED, then query user:
  Submit NUMBER_KITS = KITS_REQUESTED
  Abort Inventory Optimization Algorithm Rules
5. If KITTING_METHOD = "Inventory" then:
 5.1. If OUTPUT_SPOTS_LEFT < NUMBER_KITS_REQUESTED, then query user one of the following:
  QUIT
  CLEAR_OUTPUT_TRAY
  set NUMBER_KITS_REQUESTED = OUTPUT_SPOTS_LEFT
 5.2. Select candidate mirrors by the following rules:
  5.2.1. If candidate mirror has already been selected as part of another kit, then skip this part.
  5.2.2. If candidate part is not correct part type, then skip this part.
  5.2.3. If candidate part LOSS=null, then skip this part.
  5.2.4. If PART_TYPE = "output" and part TRANSMISSION = null, then skip this part.
  5.2.5. If candidate part STATUS = "not available", then skip this part.
  5.2.6. If candidate part survives rules 5.2.1 through 5.2.5, then accept part as open for kitting.
  5.2.7. If SELECT_STRING < > null and candidate mirror is tagged with a label SELECT_STRING, then accept part as open for kitting.
 5.3. Select output mirror randomly.
 5.4. Set MAXIMUM NUMBER TRIES = number of available outputs.
 5.5. For chosen output mirror, calculate UPPER_LOSS_LIMIT, LOWER_LOSS_LIMIT.
 5.6. Calculate LOSS_CENTER = mid-range between UPPER_LOSS_LIMIT and LOWER_LOSS_LIMIT.
 5.7. Look through all available transducers:
  5.7.1. Select transducer A and B.
  5.7.2. If transducer A = transducer B, then skip this combination.

5.7.3. Calculate KIT_LOSS_DELTA=difference loss for transducer A and loss for transducer B.

5.7.4. Select transducer combination which results in the maximum KIT_LOSS_DELTA while KIT_LOSS>KIT_LOSS_MINIMUM and KIT_LOSS<KIT_LOSS_MAXIMUM.

5.8. If potential kit passes rules 5.7, then accept kit.

5.9. If NUMBER_OF_TRIES>MAXIMUM_NUMBER_TRIES, then discontinue kitting.

5.10. If REMAINING_OUTPUTS=0 and KITS_FOUND<KITS_REQUESTED, then query user:
Submit NUMBER_KITS=KITS_REQUESTED
Abort 5.11. If REMAINING_TRANSDUCERS=0 and KITS_FOUND<KITS_REQUESTED, then query user:
Submit NUMBER_KITS=KITS_REQUESTED
Abort Rule Based Figure of Merit For the preferred performance expert system algorithm, the figure of merit is given by:

$$FM(rules) = 1 - abs(KIT\_LOSS\_DELTA)/KIT\_LOSS\_DELTA(max)$$

where KIT_LOSS_DELTA is calculated from rule 4.7.3 of the rule base, and KIT_LOSS_DELTA(max) is the maximum allowed kit loss delta. If the figure of merit is negative, it is set to zero.

Kitting Cell Neural Network The preferred kitting cell neural network typically consists of feed-forward system, trained by the back propagation method of Rumelhart (Parallel Distributed Processing, Rumelhart and McClellend, 1986). The preferred embodiment of this method uses one or more input neurons, a "hidden layer" of neurons, and one or more output neurons. The activation level of each neuron varies smoothly between zero and one by the sigmoid function:

$$f(x) = 1/(1 + exp(-x))$$

Each input parameter is assigned a single input neuron. The input value is scaled so that the minimum possible value for that parameter is set to zero, the maximum is set to one, and most other values range between these extremes. This scaled input becomes the activation level for the corresponding input neuron. The resulting activations from the input layer are passed to the hidden layer, and from there to the final output layer. The output activations are scaled to the appropriate output units and compared to the target result. The error is calculated and network weights are adjusted backwards for each layer. The process is repeated until the network is trained to within an acceptable learning threshold.

Bias neurons are used for the input and hidden layers to allow the network to learn certain facts even though results are close to zero.

The learning rate may be varied beyond the default of 1.0 during various stages of training. An increase in the learning rate raises the learning speed, but is typically only increased when the network is nearly trained.

The preferred neural network has the following inputs:

1. Month of year, expressed as a number 1-12.
2. Loss of mirror A, in parts per million (ppm).
3. Loss of mirror B, in ppm.
4. Loss of mirror C, in ppm.
5. Transmittance of mirror C in ppm.
6. Other test parameters relating to the quality of the mirrors.

A range of 10 to 15 hidden neurons may be used, depending on the success of the training. One output neuron is used which represents gyroscope power expressed in microwatts. For the optimal value for gyroscope power, P(opt), the figure of merit, as a function of the predicted output P(net) is given by:

$$FM(net) = 1 - abs(P(opt) - P(net))/P(spec)$$

where P(spec) is the maximum allowed variance of the gyroscope power from the optimal value. If the figure of merit is negative, it is set to zero.

Reconciliation

The prefererred reconciliation of the expert system and neural net consists of the weighted sum of the separate figures of merit from the expert system rule base and neural net and an extra figure of merit for operational considerations FM(op) given by:

$$FM(total) = A \times FM(net) + B \times FM(rules) + C \times FM(op)$$

where A, B, and C are weights such that $A+B+C=1$.

All figures of merit, including the total, are expressed as numbers from zero to one. Possible considerations which are incorporated into the FM(op) factor include extra merit for emptying part trays or choosing parts to decrease run time.

In actual practice, the weights are preferably distributed substantially equally as follows:

$$A = 0.33, B = 0.33, C = 0.33$$

but it will be recognized that other combinations of weights are possible in order to provide optimized results for different applications.

The present invention is to be limited only in accordance with the scope of the appended claims, since others skilled in the art may devise other embodiments still within the limits of the claims.

What is claimed is:

1. A computerized method for the automatic selection of component kits from an inventory of component parts comprising the steps of:
   forming a list of component parts using a list of rules from a rule-based expert system;
   forming a second list of component parts using weights assigned by a previously trained node-based network; and
   reconciling said first list and said second list.

2. A computerized method for the automatic selection of component kits from an inventory of component parts comprising the steps of:
   reconciling a first list of component parts based on a rule-based expert system and a second list of component parts based on a previously trained node-based neural network;
   determining an overall figure of merit for each of the potential component kits in the first and second lists; and
   designating a final list from the first and second lists of potential component kits, so that each component kit in the final list has substantially a best combined figure of merit.

3. The method of claim 2, wherein achieving the best combined figure of merit comprises doing a substantially equal weighting of the expert system figure of merit, the neural network figure of merit, and performance and operational characteristics of the potential component kits.

4. A method for the automatic selection of component kits from an inventory of component parts using a mechanized component transport system under program control of a digital computer, the method comprising the steps of:

(a) receiving input data in order to determine a type of component kit to be selected, a number of component kits to be selected, the physical location of the component parts, and performance characteristics of the component kits;

(b) creating a global list of potential component kits from the inventory of component parts;

(c) designating a first list of potential component kits by applying selection rules in order to determine an expert system figure of merit for each of the potential component kits in the global list with a rule-based expert system, and designating a second list of potential component kits by applying each of the potential component kits in the global list as an input to a previously trained node-based neural network in order to determine a neural network figure of merit;

(d) designating a final list of component kits by reconciling the first list and second list of potential component kits to be selected; and (e) outputting the final list of component kits to a job queue, whereby the component kits may be automatically assembled.

5. The method of claim 4, wherein the designation of the first list of potential component kits using an expert system further comprises the steps of:

(a) selecting at least one output component from the global list to form at least one output component combination;

(b) applying the selection rules to each of the possible selected output component combinations;

(c) designating each of potential component kits as a member of the first list that are accepted by the selection rules; and (d) determining the expert system figure of merit for each of the accepted potential component kits in the first list.

6. The method of claim 5, wherein the designation of the second list of potential component kits by applying each of the potential component kits in the global list as an input to a previously trained node-based neural network further comprises the steps of:

(a) selecting at least one output component from the first list to form at least one output component combination;

(b) performing a forward propagation on each of the possible selected output component combinations in order to determine the neural network figure of merit for each kit; and (c) designating each of potential component kits as a member of the second list that meet the performance characteristics of component kits to be selected.

7. The method of claim 6, wherein the designation of the second list of potential component kits further comprises the step of:

(a) rejecting each of the potential component kits on the second list that are predicted to exceed the performance characteristics of component kits to be selected.

8. The method of claim 4, wherein the designation of the second list of potential component kits by applying each of the potential component kits in the global list as an input to a previously trained node-based neural network further comprises the steps of:

(a) selecting at least one output component from the global list to form at least one output component combination;

(b) performing a forward propagation on each of the possible selected output component combinations in order to determine the neural network figure of merit for each kit; and (c) designating each of potential component kits as a member of the second list that meet the performance characteristics of component kits to be selected.

9. The method of claim 8, wherein the designation of the second list of potential component kits further comprises the step of:

(a) rejecting each of the potential component kits on the second list that are predicted to exceed the performance characteristics of component kits to be selected.

10. The method of claim 8, wherein the designation of the first list of potential component kits using an expert system further comprises the steps of:

(a) selecting at least one output component from the second list to form at least one output component combination;

(b) applying the selection rules to each of the possible selected output component combinations;

(c) designating each of potential component kits as a member of the first list that are accepted by the selection rules; and (d) determining the expert system figure of merit for each of the accepted potential component kits in the first list.

11. The method of claim 4, wherein the designation of the final list of component kits further comprises the steps of:

(a) determining an overall figure of merit for each of the potential component kits in the first and second lists; and (b) designating a final list from the first and second lists of potential component kits, so that each component kit in the final list has substantially a best combined figure of merit.

12. The method of claim 11, wherein the designation of the final list of component kits further comprises the steps of:

(a) sorting the first list of potential component kits by the expert system figure of merit; and (b) sorting the second list of potential component kits by the neural network figure of merit.

13. The method of claim 11, wherein achieving the best combined figure of merit comprises doing a substantially equal weighting of the expert system figure of merit, the neural network figure of merit, and performance and operational characteristics of the potential component kits.

14. A method for the automatic selection of component kits from an inventory of component parts using a mechanized component transport system under program control of a digital computer, the method comprising the steps of:

(a) receiving input data in order to determine a type of component kit to be selected, a number of component kits to be selected, the physical location of the component parts, and performance characteristics of component kits to be selected;

(b) creating a global list of potential component kits from the inventory of component parts;

(c) designating a first list of potential component kits by applying selection rules in order to determine an expert system figure of merit for each of the potential component kits in the global list with a rule-based expert system, and designating a second list of potential component kits by applying each of the potential component kits in the global list as an input to a previously trained node-based neural network in order to determine a neural network figure of merit;

(d) determining an overall figure of merit for each of the potential component kits in the first and second lists;

(e) designating a final list from the first and second lists of potential component kits, so that each component kit in the final list has substantially a best combined figure of merit; and (f) outputting the final list of component kits to a job queue, whereby the component kits may be automatically assembled.

15. The method of claim 14, wherein the designation of the first list of potential component kits using an expert system further comprises the steps of:

(a) selecting at least one output component from the global list to form at least one output component combination;

(b) applying the selection rules to each of the possible selected output component combinations;

(c) designating each of potential component kits as a member of the first list that are accepted by the selection rules; and (d) determining the expert system figure of merit for each of the accepted potential component kits in the first list.

16. The method of claim 15, wherein the designation of the second list of potential component kits by applying each of the potential component kits in the global list as an input to a previously trained node-based neural network further comprises the steps of:

(a) selecting at least one output component from the first list to form at least one output component combination;

(b) performing a forward propagation on each of the possible selected output component combinations in order to determine the neural network figure of merit for each kit; and (c) designating each of potential component kits as a member of the second list that meet the performance characteristics of component kits to be selected.

17. The method of claim 16, wherein the designation of the second list of potential component kits further comprises the step of:

(a) rejecting each of the potential component kits on the second list that are predicted to exceed the performance characteristics of component kits to be selected.

18. The method of claim 14, wherein the designation of the second list of potential component kits by applying each of the potential component kits in the global list as an input to a previously trained node-based neural network further comprises the steps of:

(a) selecting at least one output component from the global list to form at least one output component combination;

(b) performing a forward propagation on each of the possible selected output component combinations in order to determine the neural network figure of merit for each kit; and (c) designating each of potential component kits as a member of the second list that meet the performance characteristics of component kits to be selected.

19. The method of claim 18, wherein the designation of the second list of potential component kits further comprises the step of:

(a) rejecting each of the potential component kits on the second list that are predicted to exceed the performance characteristics of component kits to be selected.

20. The method of claim 18, wherein the designation of the first list of potential component kits using an expert system further comprises the steps of:

(a) selecting at least one output component from the second list to form at least one output component combination;

(b) applying the selection rules to each of the possible selected output component combinations;

(c) designating each of potential component kits as a member of the first list that are accepted by the selection rules; and (d) determining the expert system figure of merit for each of the accepted potential component kits in the first list.

21. The method of claim 14, wherein the designation of the final list of component kits further comprises the steps of:

(a) sorting the first list of potential component kits by the expert system figure of merit; and (b) sorting the second list of potential component kits by the neural network figure of merit.

22. The method of claim 14, wherein achieving the best combined figure of merit comprises doing a substantially equal weighting of the expert system figure of merit, the neural network figure of merit, and performance and operational characteristics of the potential component kits.

* * * * *